(12) United States Patent
Mao et al.

(10) Patent No.: US 7,597,999 B2
(45) Date of Patent: Oct. 6, 2009

(54) METHODS OF PREPARING CARBONACEOUS ANODE MATERIALS AND USING SAME

(75) Inventors: Zhenhua Mao, Ponca City, OK (US); Edward J. Nanni, Ponca City, OK (US); Mark W. Carel, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 435 days.

(21) Appl. No.: 11/422,824

(22) Filed: Jun. 7, 2006

(65) Prior Publication Data

US 2007/0286792 A1    Dec. 13, 2007

(51) Int. Cl.
*H01M 4/58* (2006.01)
*H01B 1/04* (2006.01)

(52) U.S. Cl. .................. 429/231.8; 252/502; 423/448

(58) Field of Classification Search ........... 423/448; 429/231.8; 252/502
See application file for complete search history.

(56) References Cited

U.S. PATENT DOCUMENTS

| | | | |
|---|---|---|---|
| 4,042,486 | A | 8/1977 | Asano et al. |
| 4,891,203 | A | 1/1990 | Singer et al. |
| 4,929,404 | A | 5/1990 | Takahashi et al. |
| 5,667,914 | A | 9/1997 | Nagamine et al. |
| 2003/0160215 | A1 | 8/2003 | Mao et al. |
| 2004/0091782 | A1 | 5/2004 | Kawano et al. |
| 2007/0092429 | A1 | 4/2007 | Mao et al. |

FOREIGN PATENT DOCUMENTS

| | | |
|---|---|---|
| JP | 01079072 | 3/1989 |
| JP | 11054123 | 2/1999 |
| JP | 2000086343 | 3/2000 |
| WO | 2004058494 A2 | 7/2004 |
| WO | WO 2005043653 A1 * | 5/2005 |
| WO | 2007063309 A1 | 6/2007 |

OTHER PUBLICATIONS

Foreign communication from a related counterpart application—International Search Report and Written Opinion, PCT/US2007/069452, Sep. 27, 2007, 12 pgs.

* cited by examiner

*Primary Examiner*—Jerry Lorengo
*Assistant Examiner*—Carlos Barcena

(57) ABSTRACT

A method for the production of carbon particles comprising selecting a precursor material, sizing said precursor material, stabilizing said precursor material, carbonizing said precursor material, and graphitizing said precursor material, wherein the precursor material has a volatile matter content of from about 5 wt. % to about 60 wt. %. A method for the production of electrode materials comprising selecting a precursor material, sizing said precursor material, stabilizing said precursor material, carbonizing said precursor material, and graphitizing said precursor material, wherein said electrode material has an average particle size of from about 1 μm to about 50 μm, a fixed carbon content of greater than about 80 wt. %, and a graphitic structure. A carbon particle having an average particle size of from about 1 μm to about 50 μm, a degree of stabilization of from about 0.1 wt. % to about 10 wt. %, a fixed carbon content of greater than about 80 wt. %, and a graphitic structure.

20 Claims, 2 Drawing Sheets

METHODS OF PREPARING CARBONACEOUS ANODE MATERIALS AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This disclosure generally relates to methods of production of carbonaceous materials. More specifically, this disclosure relates to methods of producing carbon particles for use as anode materials in electrochemical storage cells.

2. Background of the Invention

The requirements for battery performance are largely dependent on their intended application. For example, batteries for use in hybrid electric vehicles may require a very long life cycle, low cost, high gravimetric densities and high volumetric densities, while batteries for portable devices such as cellular phones and camcorders may have the additional requirement of being lightweight. Materials used for the construction of such batteries play a significant role in the batteries' ability to meet the aforementioned requirements.

Carbonaceous materials such as graphite powders have to meet several requirements in order to be used as the anode material in Lithium (Li) ion batteries. The most important requirements are high coulombic efficiency on the first cycle and reversible capacity during the charge/discharge cycles. Many processes have been developed for the production of graphite powders having the aforementioned characteristics. For example, some of the processes use special types of carbon precursors and/or particle forms such as mesophase petroleum, coal tar pitches and beads or fibers. These processes using special types of carbon precursors and/or particle forms are often complicated not only with respect to making the desired precursors but also with regards to controlling the morphology and size. Other processes for the production of said graphite powders involve modification of the regular surfaces of carbon particles by coating the particle with amorphous carbon and other materials designed to increase the coulombic efficiency on the first cycle. For example, surface modification by coating the particles may involve methods such as chemical vapor deposition and pitch coating. These processes, whether using special precursors or carrying out surface modification, add a significant cost to the manufacturing of graphite powders with the desired properties.

Thus, there exists a need for an inexpensive method of producing carbon particles suitable for use as the anode material in batteries.

BRIEF SUMMARY OF SOME OF THE PREFERRED EMBODIMENTS

Disclosed herein is a method for the production of carbon particles comprising selecting a precursor material, sizing said precursor material, stabilizing said precursor material, carbonizing said precursor material, and graphitizing said precursor material, wherein the precursor material has a volatile matter content of from about 5 wt. % to about 60 wt. %.

Also disclosed herein is a method for the production of electrode materials comprising selecting a precursor material, sizing said precursor material, stabilizing said precursor material, carbonizing said precursor material, and graphitizing said precursor material, wherein said electrode material has an average particle size of from about 1 μm to about 50 μm, a fixed carbon content of greater than about 80 wt. %, and a graphitic structure.

Also disclosed herein is a carbon particle having an average particle size of from about 1 μm to about 50 μm, a degree of stabilization of from about 0.1 wt. % to about 10 wt. %, a fixed carbon content of greater than about 80 wt. %, and a graphitic structure.

Further disclosed herein is a method for the production of carbon particles comprising selecting a precursor material, sizing said precursor material, stabilizing said precursor material, and graphitizing said precursor material, wherein the precursor material has a volatile matter content of from about 5 wt. % to about 60 wt. %.

The foregoing paragraphs outline the features and technical advantages of the present disclosure in order that the detailed description that follows may be better understood. Additional features and advantages of the invention will be described hereinafter. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWING

For a detailed description of the preferred embodiments of the invention, reference will now be made to the accompanying drawings.

DETAILED DESCRIPTION OF TEE PREFERRED EMBODIMENTS

Figure 1:
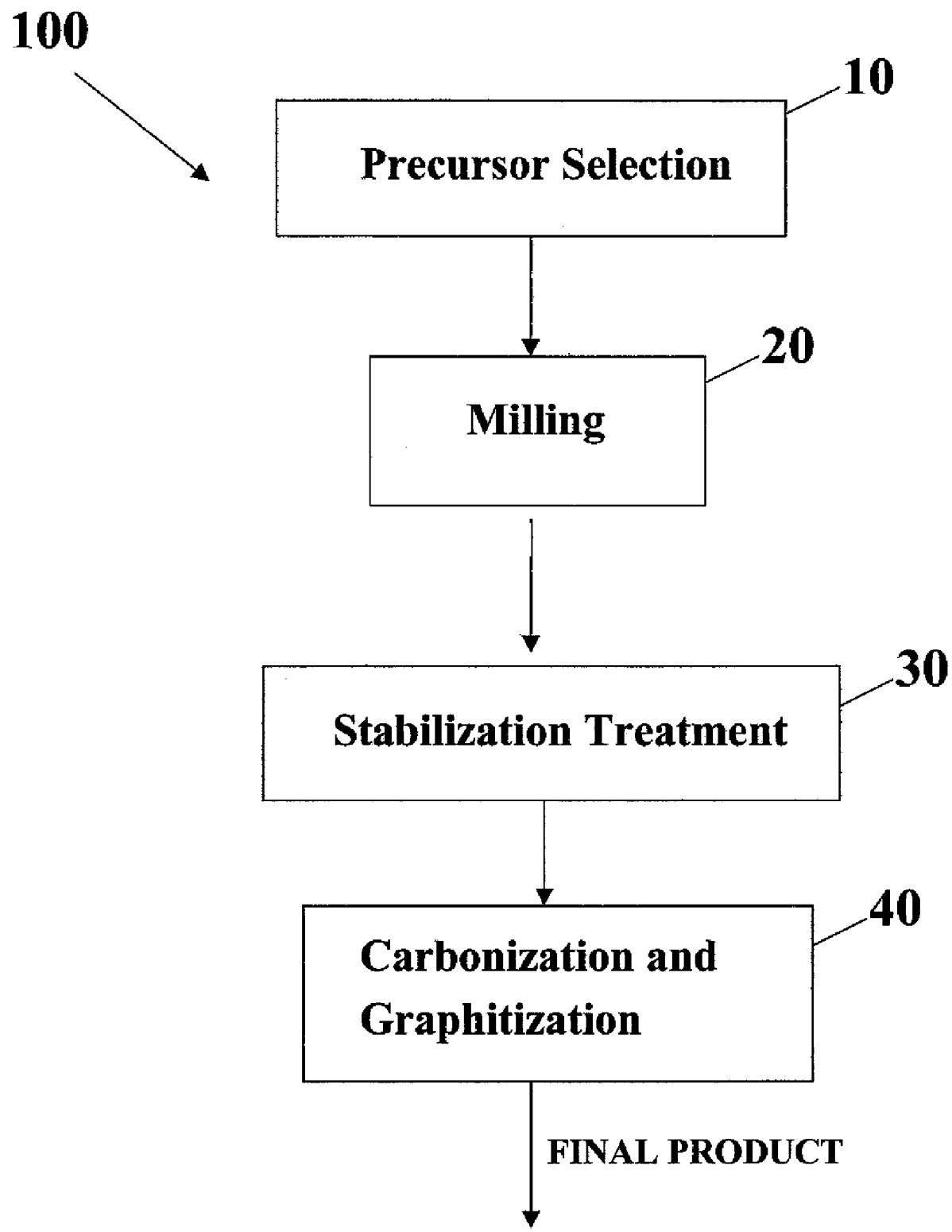
FIG. 1 is a process flow diagram for carbon particle production.

Disclosed herein are methodologies for the production of carbon particles that may be suitable for use as anode materials in Li ion batteries. The methodologies to be described herein may result in the inexpensive production of carbon particles having an increased initial coulombic efficiency and reversible capacity during charge/discharge cycles. One embodiment, 100, of the present method shown in FIG. 1 comprises at least the steps of precursor selection, sizing, stabilization, carbonization and graphitization. It is to be understood that these process steps are carried out independently, thus any combination of these steps may be contemplated. Alternatively, the process may be carried out in the order described herein.

According to certain embodiments, the method 100 initiates with selection of a precursor in step 10. The precursor may be a carbon-yielding hydrocarbon. Alternatively, the precursor is a carbon-yielding hydrocarbon whose particles do not foam or melt when continuously heated at a rate of from about 1° C./minute or greater to a temperature of greater than about 200° C. For example and without Imitation, the precursor may be a green coke such as an uncalcined petroleum or coal tar coke, a high molecular weight pitch, a high molecular weight tar or combinations thereof Herein a high molecular weight pitch or high molecular weight tar refers to a pitch or tar having components with a molecular weight of greater than about 1000 Daltons.

As used herein, "pitch" refers to a residue derived from pyrolysis of organic material or tar distillation that is solid at room temperature and consists primarily of a complex mixture of aromatic hydrocarbons and heterocyclic compounds. Pitch can be derived from polymerization or condensation of petroleum feedstock. Depending on the structure of the pitch, the pitch may be isotropic or mesophase, either of which are suitable for use in this disclosure. As used herein "coke" refers to coal tar cokes and "petroleum coke," or the final product of thermal decomposition in the condensation process in catalytic cracking. Because coke is the hydrocarbon product that remains after heating high boiling hydrocarbons to temperatures below 625° C., it may contain hydrocarbons that can be released as volatiles during subsequent heat treatments at temperatures up to 1325° C. In certain embodiments, the precursor material comprises uncalcined petroleum or tar cokes, sometimes referred to as "green coke."

In one embodiment, the green coke may be flintier characterized by a volatile matter content of greater than about 5 weight percent (wt. %) to about 60 wt. %, alternatively of greater than about 5 wt. % to about 40 wt. %. Herein "volatile matter" refers to the portion of coke that is driven off when the coke is heated to about 950° C. in the absence of air and consists of a mixture of gases and low-boiling-point organic compounds that condense into oils and tars upon cooling. The volatile matter content of the green coke may be determined in accordance with ISO 9406:1995 Determination of Volatile Matter by Gravimetric Analysis or ASTM D3175-02 Standard Test Method for Volatile Matter in the Analysis Sample of Coal and Coke.

Such green cokes may be obtained by processes that are used to produce any grade of coke. For example and without limitation, green cokes may be obtained by processes for the manufacture of fuel, regular or premium grade cokes. Such processes are well known to one of ordinary skill in the art. In an embodiment, green coke having the disclosed characteristics is produced using any feedstock known for the production of fuel, regular or premium grade coke. For example and without limitation, the coker feed may consist of atmospheric tower residue, vacuum tower residue, ethylene cracker residue, decant/slurry oils from fluid catalytic crackers, gas oil from refinery sources, other residual streams from refinery sources or combinations thereof. The volatile matter content of the green coke may be controlled by variations of the manufacturing process to produce green coke. Methods of varying the manufacturing process to produce green coke with a volatile matter content in the disclosed ranges are known in the art and include for example, shortening the coker drum fill or shortening the heat/soak times.

In an embodiment, method 100 proceeds to block 20 wherein the precursor material is sized. The precursor material may be sized by any method compatible with the materials of this disclosure to produce particles having a mean particle size of from about 0.1 µm to about 50 µm, alternatively from about 1 µm to about 30 µm, and alternatively from about 1 µm to about 15 µm. The mean particle size may be determined by any standard method for the determination of particle size. Such methods are known to one of ordinary skill in the art and include for example and without limitation the use of metal mesh sieves, optical microscopy or single-particle optical sensing measures. In a preferred embodiment, the precursor material is sized by a mechanical method such as milling.

"Milling" herein refers to a process of bulk solid size reduction. Examples of suitable milling methods include but are not limited to impact milling, attrition milling, air jet milling, ball milling, fine media milling, and knife milling. Any mechanical milling method may be employed, so long as it is effective for achieving the desired particle size reduction. Such milling methods, conditions and equipment are known to one of ordinary skill in the art. Precursor material milled to the disclosed mean particle sizes may consist mainly of granular particles. Hereafter precursor materials that have been sized to the disclosed ranges are referred to as "sized particles."

Referring again to FIG. 1, method 100 may then proceed to block 30 wherein the sized particles are subjected to stabilization. In preferred embodiments, the sized particles are stabilized by a thermal-chemical treatment. Such treatments, also termed stabilization treatments, may be carried out using any methods and under any conditions compatible with the materials of this disclosure as known to one of ordinary skill in the art. In an embodiment, the stabilization treatment comprises heating the particles to a temperature of from about 250° C. to about 350° C. in the presence of an oxidizing agent. Herein an oxidizing agent refers to a chemical, which can act as an electron acceptor. Oxidizing agents are well known in the art. Examples of such agents suitable for use in his disclosure include without limitation air, oxygen gas, organic acids, inorganic acids, metal salts and oxides such as $NaNO_3$; high valence transition metal oxides such as $KMnO_4$, $K_2Cr_2O_7$, or combinations thereof These agents may be used to incorporate oxygen into the sized particles and the extent to which oxygen incorporation occurs is referred to herein as the degree of stabilization. The degree of stabilization (i.e. oxygen incorporation) may be determined by any technique known for assessing oxygen incorporation into a particle. For example, the degree of stabilization may be measured by net weight gain during stabilization. In an embodiment, the net weight gain during stabilization is from about 0.1 wt. % to about 20 wt. %, preferably from about 0.1 wt. % to about 10 wt. %, more preferably from about 0.5 wt. % to about 3 wt. %.

In some embodiments, the materials of this disclosure following stabilization will include sized particles of the mean size previously disclosed, larger particles and hard agglomerates. The larger particles and hard agglomerates may be separated from the sized particles by conventional separation methods as known in the art. For example, the larger particles and hard agglomerates may be separated from the sized particles by sieving through a fine screen having a desired mesh size. The sized particles having been processed through the step represented as block 30 in FIG. 1 are hereafter referred to as sized, stabilized particles.

In certain embodiments, method 100 concludes at block 40 and the sized, stabilized particles are subjected to carbonization and graphitization. Both carbonization and graphitization are thermal treatments. Carbonization functions primarily to increase the carbon:hydrogen ratio of the material, whereas graphitization is designed to promote the formation of graphitic crystal structures.

The sized stabilized particles may be carbonized and graphitized by any method compatible with the materials of this disclosure. In an embodiment, the sized stabilized particles are carbonized by heating the particles in an inert environment at a temperature of from about 400° C. to about 1500° C., alternatively from about 800° C. to about 1100° C. for a sufficient time to obtain a carbon content of greater than about 80 wt. %. The carbonization may be carried out for a time period ranging from about 1 min to about 4 hours. Inert environments may comprise without limitation nitrogen gas, argon gas, helium gas, carbon monoxide, carbon dioxide or combinations thereof. Carbonization of the sized, stabilized particles under the disclosed conditions may result in the particles having a fixed carbon content of from about 80 wt. % to about 98 wt. %, alternatively from about 85 wt. % to about 95 wt. %. Sized stabilized particles that have been subjected to carbonization as disclosed are hereafter referred to as "sized, stabilized, carbonized particles."

In a preferred embodiment, the sized, stabilized, carbonized particles are further graphitized. The graphitization of the sized, stabilized, carbonized particles may be carried out in an inert environment such as previously described at a temperature of greater than about 2000° C., alternatively greater than about 2500° C., alternatively greater than about 3000° C. for from about 1 minute to about 2 hours. The sized, stabilized, carbonized, and graphitized particles of this disclosure are sometimes referred to herein as "processed carbon particles."

In some embodiments, the materials of this disclosure following carbonization and graphitization will include sized, stabilized, carbonized, graphitized particles of the mean size previously disclosed, larger particles and hard agglomerates. The larger particles and hard agglomerates may be separated from the sized, stabilized, carbonized, graphitized particles as previously described.

The processed carbon particles produced as disclosed herein may be used to form electrodes, such as, for example, the anode material of electrical storage cells or rechargeable batteries. Techniques for the formation of the processed carbon particles of this disclosure into anodes are known to one of ordinary skill in the art. Such anodes may be further used in the construction of rechargeable batteries, including Li-ion batteries. Techniques for the fabrication of said batteries are also known-to one of ordinary skill in the art. In one embodiment, a method for the manufacture of an electrochemical storage cell comprises the steps of incorporating into the anode of an electrochemical storage cell the processed carbon particles of this disclosure.

In certain embodiments, the methodology disclosed herein may produce processed carbon particles having some or all of the following characteristics: an average particle size of from about 1 μm to about 50 μm, a degree of stabilization of from about 0.5 wt. % to about 10 wt. %, a fixed carbon content of greater than about 80 wt. %, and a graphitic structure. A particle subject to the disclosed processing but lacking all of the aforementioned characteristics may be fuirther processed to produce a particle having all of the disclosed characteristics. Methods of further processing the particles to produce these characteristics are known to one of ordinary skill in the art and include without limitation carbonization and/or graphitization.

EXAMPLES

The invention having been generally described, the following examples are given as particular embodiments of the invention and to demonstrate the practice and advantages thereof. It is understood that the examples are given by way of illustration only and are not intended to limit the specification or the claims in any manner.

Example 1

This example demonstrates the effect of using a solid nitrate as the oxidizing agent at the stabilization step. A petroleum green coke was selected as the precursor material. This petroleum coke has a carbon content of about 71% by weight. The carbon content was determined by heating the coke at 1000° C. in nitrogen gas for 2 hours. In this example, the green coke was crushed and milled to a fine powder having a mean particle size of about 9 micrometers (10% below 3 micrometers but 90% below 14 micrometers).

Thirty-four grams of the milled petroleum coke powder was mixed with a lithium nitrate ($LiNO_3$) solution that consisted of 0.75 g of $LiNO_3$, 10 g of deionized water, and 2 g of acetone. The resulting mixture was dried at 40° C. for 3 hours under vacuum. The resulting powder was heated at 1° C./minute to 250° C. and held at 250° C. for 3 hours, subsequently heated at 1° C./minute to 300° C. and held for 3 hours and finally heated at 3° C./minute to 1000° C. and held for 2 hours at 1000° C. Subsequently, the material was cooled at 4° C./minute to room temperature. All the heating steps were conducted under nitrogen gas atmosphere. It should be noted here that the stabilization step (temperature below 300° C.) and carbonization step were conducted sequentially without transferring the green coke in this example. $LiNO_3$ was used as the oxidizing agent.

The carbonized powder contained some large hard lumps or agglomerates, which were removed by sieving through a 400-mesh screen. The remaining 400 mesh powder was graphitized at 3000° C. for 45 minutes in argon (Ar). The resulting graphite powder was then tested as the anode material for a lithium ion battery as described below.

The above graphite powder was evaluated as the anode material for lithium ion batteries in coin cells with lithium metal foil as the other electrode. The powder was processed into a thin film on copper substrate with the composition of 7 wt % polyvinylidene fluoride (PVDF). In preparing the electrode, the graphite powder and a 10 wt % PVDF solution were first thoroughly mixed in the above composition to form a uniform slurry. The resulting slurry was cast on a copper foil using a hand doctor-blade. The cast film was then dried on a hot plate at 110° C. for 30 minutes, and subsequently pressed to a density of about 1.3 g/cc with a hydraulic rolling press.

Disks of 1.65 $cm^2$ were punched out from the above film and used as the positive electrode in a coin cell for electrochemical tests. The other electrode was lithium metal. A glass matt (Whatman FG/B*) and a porous polyethylene film (Cellgaurd™ 2300) were used as the separator between the electrode and Li metal foil. Both the electrodes and separator were soaked in 1 M $LiPF_6$ electrolyte. The solvent for the electrolyte consisted of 40 wt % ethylene carbonate, 30 wt % diethyl carbonate, and 30 wt % dimethyl carbonate. The cells were first charged under a constant current of 1 mA until the cell voltage reached 0.0 volt and further charged at the constant voltage of 0.0 volt for one hour or until the current dropped to below 50 μA, and then discharged under the same current until the cell voltage reached 2.0 volts. The number of coulombs passed during charging and discharging was recorded and used to determine the capacity of the graphite powders and the coulombic efficiency for each cycle. All tests were conducted at room temperature (~23° C.). The discharge capacity and coulombic efficiency at both the first and fifth cycles are given in Table 1.

Example 2

This example was similar to Example 1, but it used sodium nitrate as the oxidizing agent and at a relatively large quantity compared to Example 1. First, 22.0 g of the same petroleum coke powder as Example 1 were mixed with a sodium nitrate ($NaNO_3$) solution that consisted of 1.7 g of $NaNO_3$, 5 g of deionized water, and 2 g of acetone. The resulting mixture was dried and heat-treated for both stabilization and carbonization in the same way as Example 1.

Figure 2:
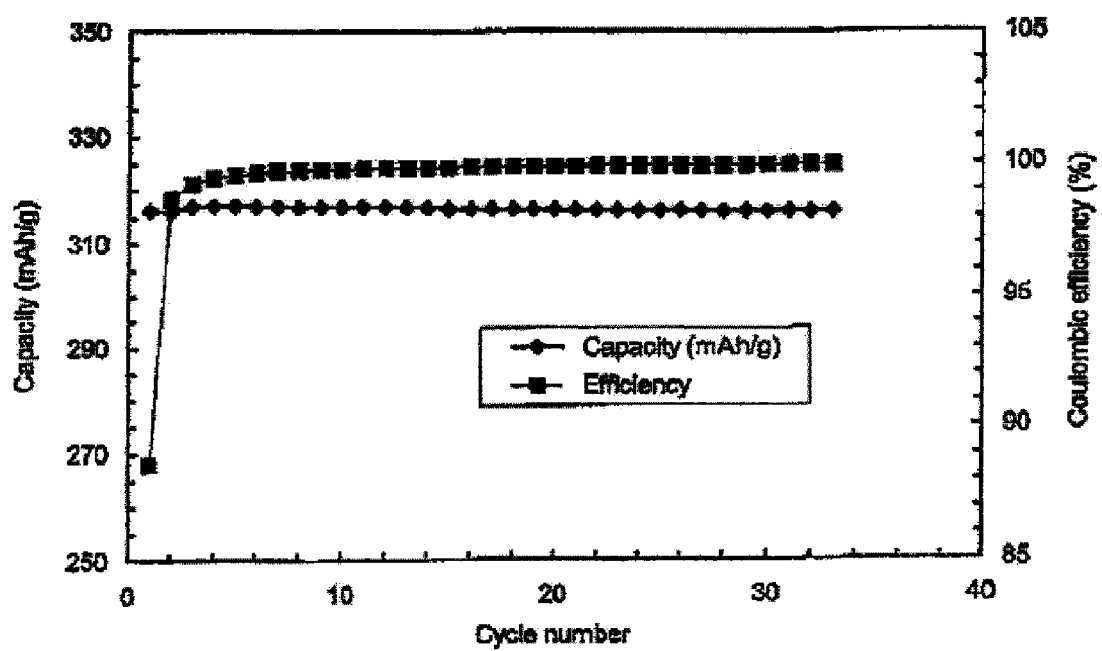
FIG. 2 is a graph of capacity and coulombic efficiency versus cycle number.

The carbonized powder contained fewer large agglomerates than that in Example 1. Again, the large agglomerates were removed by sieving through a 400-mesh screen before graphitization. The 400 mesh powder was graphitized under the same condition as that in Example 1, and the resulting graphite powder was tested in the same way as Example 1. The test results are listed in Table 1. In addition, the recharge ability of the graphite powder was tested beyond 5 cycles. Both the capacity and coulombic efficiency are plotted in FIG. 2.

Example 3

This example is similar to Example 2 in the terms of oxidizing agent and quantity, but the mean particle size was larger. The same petroleum green coke as Example 1 was used in this example. First, the petroleum coke was jet-milled to a mean particle size of about 15 micrometers (10% below 7 micrometers and 90% below 30 micrometers), 23.0 g of the milled petroleum coke powder were mixed with a sodium nitrate solution that consisted of 1.8 g of $NaNO_3$, 4 g of deionized water, and 2 g of acetone. The resulting mixture was dried and heat-treated in the same way as Example 1.

Similarly, the resulting powder was sieved through a 400-mesh screen to remove large agglomerates. The 400 mesh powder was graphitized at 3000° C. for 45 minutes in Ar. The resulting graphite powder was tested in the same manner as Example 1. The test results are listed in the table for comparison.

Example 4

This example illustrates use of air as the oxidizing agent at the stabilization step. 100 g of the same milled petroleum coke powder as given in Example 3 were spread on an 8" diameter glass dish, and heated at 1° C./minute to 250° C. and held for 3 hours and heated at 1° C./minute to 290° C. and held at 290° C. for 10 hours under reduced air pressure (~–18" Hg). The heating in reduced air pressure caused oxidation of the green coke powder; consequently, the green coke particles became infusible and did not fuse during subsequent carbonization and graphitization steps.

The resulting stabilized coke powder was then heated at 5° C./minute to 800° C. and held at 800° C. for 2 hours, and subsequently cooled to room temperature in nitrogen gas atmosphere. The carbonized powder was then graphitized at 3000° C. for 45 minutes under an argon gas environment. The resulting graphite powder was then tested in the same way as Example 1, and the test results are also listed in Table 1.

Example 5

Similarly to Example 4, 100 g of the same milled petroleum coke as that in Example 1 were spread on 8" diameter glass dish, and heat-treated in the same way as Example 4 for all the steps (stabilization, carbonization, and graphitization). The test results of the graphite powder are also listed in Table 1.

Comparative Examples

Comparative Example 1

This example illustrates that the green coke powder can be coated with a petroleum pitch and subsequently heat-treated to yield a product with similar electrochemical properties as Example 1, although the route is more complicated.

Twenty grams of the same petroleum coke powder as that in Example 3 were dispersed in 100 g of xylene to form solution A in a sealed stainless steel vessel and heated to 140° C. while the solution was continuously agitated. At the same time 40 g of a petroleum pitch were dissolved in 40 g of xylene to form solution B. Solution B was also heated to 140° C. and then poured into Solution A and thoroughly mixed. The resulting solution was heated at 180° C. for 10 minutes and then cooled to room temperature while the solution was continuously agitated. The resulting solid powder was separated by filtration and washed twice with 50 ml of xylene and then dried under vacuum. The resulting dry powder weighed 23.8 g, giving 16% pitch in the powder.

The above powder was spread on a glass dish (about 4 inches in diameter), placed in a furnace, and heated in the following sequences under reduced air pressure (about –15 inch Hg); 5° C./minute to 160° C., 1° C./minute to 250° C. and held at 250° C. for 2 hours, and then 1° C./minute to 280° C., and held at 280° C. for 8 hours, and then cooled to ambient temperature. During the heating, oxygen gas in the air reacted with the coated pitch. As a result, the reacted pitch film on carbon particles became infusible and it may also yield a desired crystalline structure during subsequent carbonization and graphitization steps.

The above powder was placed in a tube furnace and heated at 800° C. for 2 hours in nitrogen gas and then cooled to room temperature (–22° C.). The resulting powder was subsequently transferred into an induction furnace and heated at 3000° C. for 45 minutes in argon gas and then cooled to room temperature. The resulting graphite powder was tested in the same way as Example 1 and the test results are given in Table 1 for comparison.

Comparative Example 2

The example illustrates the effect of a different petroleum coke. The green petroleum coke used in this example contained about 92% carbon content, compared to 71% in Example 1. When this petroleum coke powder was heated up rapidly in nitrogen gas, it did not sinter or foam. In this example, 100 g of the milled petroleum coke powder (the mean particle size about 8 micrometers) were spread on 8" diameter glass dish, and heated at 1° C./minute to 250° C. and held for 3 hours and heated at 1° C./minute to 290° C. and held at 290° C. for 10 hours under reduced air pressure (~–18" Hg).

The resulting coke powder was then heated at 5° C./minute to 800° C. and held at 800° C. for 2 hours, and subsequently cooled to room temperature in nitrogen gas atmosphere. The carbonized powder was then graphitized at 3000° C. for 45 minutes under argon gas environment. The resulting graphite powder was also tested in the same way as Example 1, and the results are listed in Table 1.

Comparative Example 3

This example demonstrates the advantages of the stabilization step with the petroleum green coke in Example 1. 100 g of the same petroleum coke as in Example 1 were heated at 5° C./minute to 800° C. and held at 800° C. for 2 hours in nitrogen, and subsequently cooled to room temperature. The resulting powder sintered together. Such hard sintered material cannot be used as-is unless it is ground again. Therefore, the material could not be tested as a powder.

TABLE 1

|  | 1st cycle | | 5th cycle | |
|---|---|---|---|---|
|  | Capacity (mAh/g) | Coulombic Efficiency (%) | Capacity (mAh/g) | Coulombic Efficiency (%) |
| Example | | | | |
| 1 | 320.5 | 94.1 | 333.0 | 99.7 |
| 2 | 315.8 | 93.6 | 313.5 | 99.8 |
| 3 | 330.3 | 92.3 | 327.8 | 99.7 |
| 4 | 327.2 | 91.7 | 323.2 | 99.4 |
| 5 | 317.6 | 92.5 | 314.0 | 99.4 |
| Comparative | | | | |
| 1 | 321.0 | 93.8 | 317.6 | 99.4 |
| 2 | 219.8 | 39.0 | 321.4 | 99.0 |
| 3 | X | X | X | X |

The test results in Table 1 clearly show that the graphite powders prepared according to the principles disclosed herein exhibit a good first cycle coulombic efficiency and reversible capacity.

While preferred embodiments of the invention have been shown and described, modifications thereof can be made by one skilled in the art without departing from the scope of the invention. The embodiments described herein are exemplary only, and are not intended to be limiting. Many variations and modifications of the invention disclosed herein are possible and are within the scope of the invention. For example, where numerical ranges or limitations are expressly stated, such express ranges or limitations should be understood to include incremental ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required; both alternatives are intended to be within the scope of the claim. Use of inclusive terms such as comprises, includes, having, etc. should be understood to provide support for narrower terms such as consisting of, consisting essentially of, comprised substantially of, etc.

Accordingly, the scope of protection is not limited by the description set out above but is only limited by the claims that follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method for the production of carbon particles comprising:
    (a) selecting a precursor material, wherein the precursor material is an uncalcined petroleum coke, an uncalcined coal tar coke, a high molecular weight pitch, a high molecular weight tar, or combinations thereof;
    (b) sizing said precursor material;
    (c) stabilizing said precursor material;
    (d) carbonizing said precursor material; and
    (e) graphitizing said precursor material,
wherein the precursor material when selected has a volatile matter content of from about 5 wt. % to about 60 wt. % and the sizing produces sized particles that remain uncoated during the stabilizing, carbonizing, and graphitizing to form the carbon particles capable of achieving at least 91% first cycle coulombic efficiency when used as electrode material.

2. The method of claim 1 wherein the precursor material has a volatile matter content of from about 5 wt. % to about 40 wt. %.

3. The method of claim 1 wherein the precursor material is a green coke.

4. The method of claim 3 wherein the coke feedstock is an atmospheric tower residue, a vacuum tower residue, an ethylene cracker residue, a decant or slurry oil from a fluid catalytic cracker or combinations thereof.

5. The method of claim 1 wherein the precursor material is sized to a mean particle size of from about 1 μm to about 50 μm.

6. The method of claim 1 wherein the precursor material is sized to a mean particle size of from about 1 μm to about 30 μm.

7. The method of claim 1 wherein the precursor material is sized to a mean particle size of from about 1 μm to about 15 μm.

8. The method of claim 1 wherein the sizing of the precursor material is by a mechanical milling method.

9. The method of claim 1 wherein the stabilization treatment comprises heating the precursor material in the presence of an oxidizing agent.

10. The method of claim 9 wherein the precursor material is heated to a temperature of from about 250° C. to about 350° C.

11. The method of claim 9 wherein the oxidizing agent is air, oxygen gas, an organic acid, an inorganic acid, a metal salt, a metal oxide, a high valence transition metal oxide or combinations thereof.

12. The method of claim 1 wherein the degree of stabilization of the precursor material is from about 0.1 wt. % to about 20 wt. %.

13. The method of claim 12 wherein the degree of stabilization is measured as the net weight gain of the precursor material during stabilization.

14. The method of claim 1 further comprising separating larger particles and hard agglomerates from the precursor material after stabilization.

15. The method of claim 1 wherein step (b) is carried out between steps (a) and (c).

16. The method of claim 1 wherein the precursor material is carbonized in an inert environment at a temperature of from about 400° C. to about 1500° C.

17. The method of claim 1 wherein carbonization results in the precursor material having a fixed carbon content of greater than about 80 wt. %.

18. The method of claim 1 wherein the precursor material is graphitized at a temperature of greater than about 2000° C.

19. The method of claim 1 wherein steps (d) and (e) are carried out after step (c).

20. The method of claim 1 further comprising separating larger particles and hard agglomerates from the precursor material after step (e).

* * * * *

UNITED STATES PATENT AND TRADEMARK OFFICE
CERTIFICATE OF CORRECTION

PATENT NO. : 7,597,999 B2  Page 1 of 1
APPLICATION NO. : 11/422824
DATED : October 6, 2009
INVENTOR(S) : Mao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 556 days.

Signed and Sealed this

Twenty-eighth Day of September, 2010

David J. Kappos
*Director of the United States Patent and Trademark Office*